US008836293B1

(12) United States Patent
Rozman et al.

(10) Patent No.: US 8,836,293 B1
(45) Date of Patent: Sep. 16, 2014

(54) VARIABLE SPEED CONSTANT FREQUENCY SYSTEM WITH GENERATOR AND ROTATING POWER CONVERTER

(71) Applicant: Hamilton Sundstrand Corporation, Windsor Locks, CT (US)

(72) Inventors: Gregory I. Rozman, Rockford, IL (US); Jacek F. Gieras, Glastonbury, CT (US); Steven J. Moss, Rockford, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 0 days.

(21) Appl. No.: 13/835,089

(22) Filed: Mar. 15, 2013

(51) Int. Cl.
*H02P 11/00* (2006.01)
(52) U.S. Cl.
USPC .............................................. 322/25; 322/37
(58) Field of Classification Search
USPC ................................... 322/22, 23, 24, 25, 37
See application file for complete search history.

(56) References Cited

U.S. PATENT DOCUMENTS

| | | | |
|---|---|---|---|
| 4,841,216 A * | 6/1989 | Okada et al. ..................... | 322/10 |
| 5,055,765 A | 10/1991 | Rozman et al. | |
| 5,325,043 A | 6/1994 | Parro | |
| 5,363,032 A * | 11/1994 | Hanson et al. .................. | 322/10 |
| 5,764,036 A * | 6/1998 | Vaidya et al. .................... | 322/90 |
| 6,281,664 B1 | 8/2001 | Nakamura et al. | |
| 7,053,590 B2 * | 5/2006 | Wang .............................. | 322/24 |
| 7,064,524 B2 | 6/2006 | Yao | |
| 7,196,498 B2 | 3/2007 | Yao | |
| 7,282,893 B2 | 10/2007 | Yao | |
| 7,439,713 B2 | 10/2008 | Dooley | |
| 8,237,416 B2 * | 8/2012 | Rozman et al. ................. | 322/22 |
| 8,358,111 B2 * | 1/2013 | Rozman et al. ................. | 322/46 |
| 8,427,116 B2 * | 4/2013 | Rozman et al. ................. | 322/37 |
| 8,699,251 B2 | 4/2014 | Rozman et al. | |

* cited by examiner

*Primary Examiner* — Nicholas Ponomarenko
(74) *Attorney, Agent, or Firm* — Cantor Colburn LLP

(57) ABSTRACT

An electric power generating system includes a brushless wound field synchronous generator with n-number of power generating channels and n-number of bidirectional switches alternatively controlled to provide ac power at the output. Each power generating channel includes a control rotating transformer, a rotating power converter supplying power to field winding from the rotating power supply, and a center-tap single phase armature winding connected to the bidirectional switches. Rotating power converter modulates current in the field winding to obtain desired frequency and phase at the system output.

9 Claims, 1 Drawing Sheet

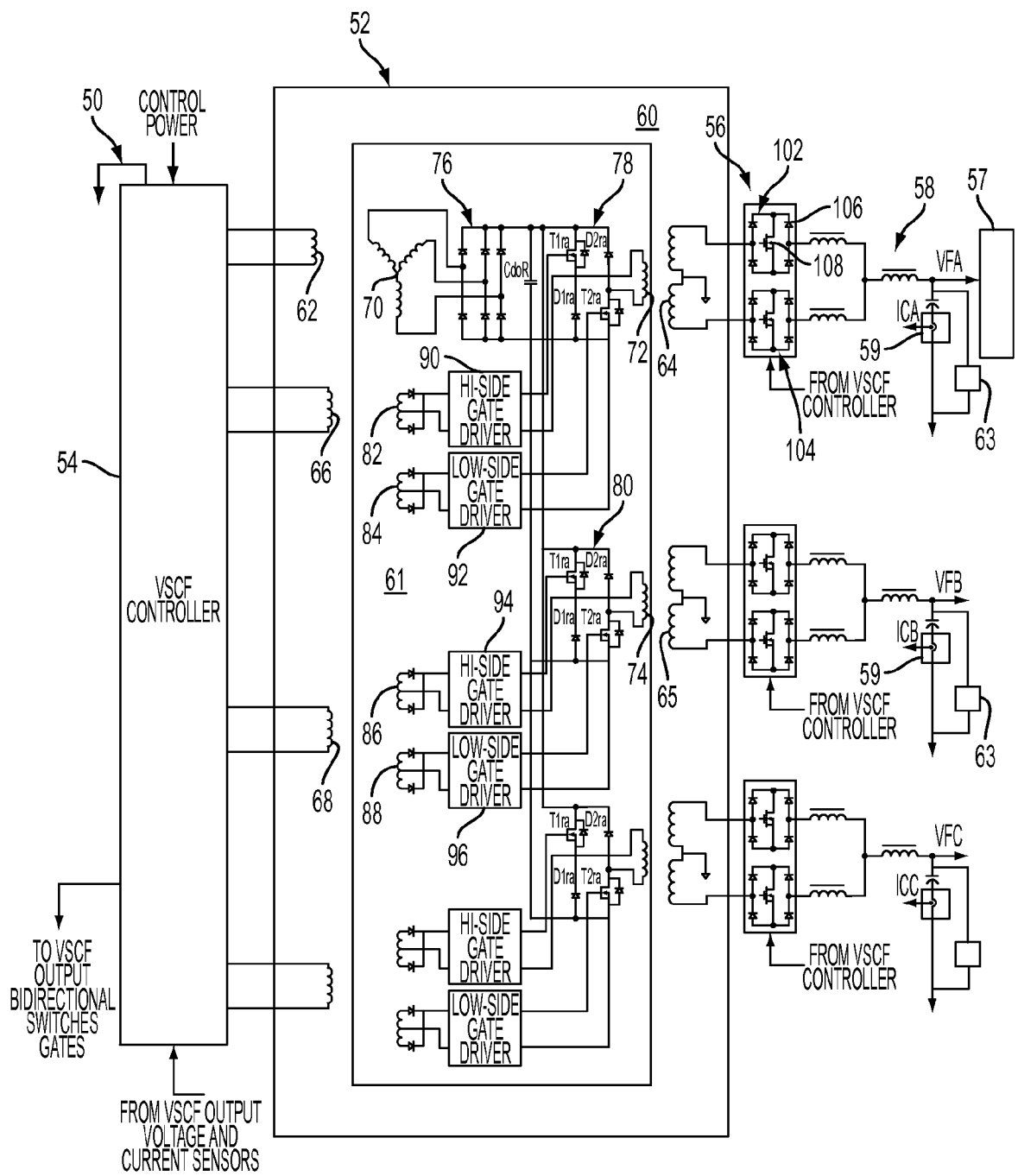

VARIABLE SPEED CONSTANT FREQUENCY SYSTEM WITH GENERATOR AND ROTATING POWER CONVERTER

CROSS-REFERENCE TO RELATED APPLICATION(S)

Reference is made to application Ser. No. 13/833,809, entitled "GENERATOR ARCHITECTURE WITH MAIN FIELD ROTATING POWER CONVERTER", application Ser. No. 13/833,212, entitled "GENERATOR ARCHITECTURE WITH PMG EXCITER AND MAIN FIELD ROTATING POWER CONVERTER", application Ser. No. 13/836,428, entitled "EPGS ARCHITECTURE WITH MULTI-CHANNEL SYNCHRONOUS GENERATOR AND COMMON FIELD REGULATED EXCITER", application Ser. No. 13/836,255, entitled "METHOD OF CONTROLLING ROTATING MAIN FIELD CONVERTER", and application Ser. No. 13/836,007, entitled "EPGS ARCHITECTURE WITH MULTI-CHANNEL SYNCHRONOUS GENERATOR AND COMMON UNREGULATED PMG EXCITER", which are filed on even date herewith, are assigned to same assignee as this application, and which the entire disclosure off all above-reference applications hereby being incorporated by reference.

BACKGROUND

The present inventive concept is related to generator architectures and in particular to generator architectures utilizing main field rotating power converters.

In the simplest terms, generators convert mechanical energy to electrical energy via the interaction of rotating magnetic fields and coils of wire. A multitude of generator architectures have been developed with various means of providing interaction between magnetic fields and coils of wire. For example, a permanent magnet generator (PMG) utilizes permanent magnets to generate a constant magnetic field, which is rotated via the mechanical energy supplied by a prime mover such that the rotating magnetic field interacts with the stator coils to provide an output voltage. Another type of generator supplies current through a field coil to generate the desired magnetic field, which is rotated via the mechanical energy supplied by a prime mover, such that a rotating magnetic field is created that interacts with stator coils to provide an output voltage.

In the former example, the output voltage supplied by the PMG depends only on the magnitude of the mechanical energy supplied by the prime mover. In the latter example, the output voltage of the generator can be regulated by varying the current supplied to the field coil. For applications in which the output voltage must be regulated, the latter example, known as a wound field synchronous machine, is widely utilized. A PMG is sometimes utilized in conjunction with the brushless wound field synchronous machine to source the current supplied to an exciter field winding to regulate the output of the wound field synchronous machine.

For example, in aircraft applications, a typical variable frequency generator (VFG) includes a permanent magnet section, an exciter section, and a main generator section. The permanent magnet portion includes permanent magnets employed on the rotating portion, which generate an alternating current voltage on the stator portion. The AC voltage provided by the permanent magnet portion is rectified and selectively applied to the exciter winding on the stationary portion of the exciter. The exciter field current interacts with the rotating exciter armature windings to provide an AC voltage. A rotating rectifier rectifies the AC voltage and supplies the DC voltage to a main field winding on the rotating portion of the main generator section. Rotation of the motive power shaft and the main field winding induces three-phase AC output voltage on the generator armature winding. The magnitude of the AC generator output voltage is regulated by controlling the current supplied to the exciter field coil on the stationary portion of the exciter. The three-phase output voltage and frequency of the generator is subjected to the speed of motive power shaft. To achieve a three-phase constant frequency and constant voltage power, a three-phase dc link inverter is employed between the generator output and the load. This type of an electric power generating system is commonly known as a variable speed constant frequency (VSCF) system. However, conventional (VSCF) have a reduced power density and do not provide a means of controlling the generating system to control the power density.

SUMMARY

A generator system comprises a generator having a stationary portion and a rotating portion, a number of identical output channels and a control unit. The generator comprises an exciter field, a rotating power supply, and a number of identical generator channels. The exciter field winding is disposed on the stationary portion. The rotating power supply disposed on the rotating portion and comprises of a three-phase exciter armature winding connected to a 6-pulse rectifier, and a dc bus capacitor. Each generator channel comprises a control transformer primary winding disposed on the stationary portion, a main field winding disposed on the rotating portion, a main field power converter disposed on the rotating portion that delivers modulated dc power from the rotating power supply, a center-tap single phase armature winding disposed on the stationary portion to produce dc modulated power. Output channel comprises of a set of two bidirectional switches connected to the generating channel outputs of the single phase armature winding and alternatively controlled to provide alternative power at desired frequency. Each output channel further includes an output filter connected to the bidirectional switches via interface inductors. Each generating channel yet further includes control transformer secondary windings and a set of gate drives disposed on the rotating portion and communicating control signals to the main field power converter switches to provide desired frequency at the load. The generator system further includes a variable speed constant frequency control unit (VSCFCU) in electrical communication with the generator and output channels. The VSCFCU is configured to generate the control signals based on the output phase voltage and output filter capacitor current to provide n-phase constant voltage constant frequency ac power at the load These and other features of the present invention can be best understood from the following specification and drawing, the following of which is a brief description.

BRIEF DESCRIPTION OF THE DRAWINGS

FIG. 1 is a circuit diagram of an electric power generation and distribution system including a variable speed constant frequency unit according to an embodiment of the present invention.

DETAILED DESCRIPTION

FIG. 1 is a circuit diagram of electric power generating system 50 according to an embodiment of the present inventive concept. System 50 includes a generator 52 and a variable speed constant frequency control unit (VSCFCU) 54. In at least one embodiment illustrated in FIG. 1, the generator is a multi-channel generator 52, which includes a plurality of channels. A switching unit 56 may be connected to the output of each channel of the multi-channel generator 52 to provide a desired frequency and phase at the load 57. Each switching unit 56 includes a pair of bi-directional switches 58, 60, which are discussed in greater detail below. In addition, an output filter 62, such as an LC filter, is connected to the output of each switching unit 56 via a set of interface inductors 64 to filter out a high frequency component. Phase voltage, e.g., voltage across filter capacitor 66, and capacitor current delivered by the current sensor 68 are fed back to the VSCFCU 54. The VSCFCU 54 may be in connection with each switching unit 56 to control each respective pair of bi-directional switches 58, 60. Accordingly, the VSCFCU 54 may control the modulation of the output voltage at each channel based on the feedback phase voltage and capacitor current (Icx). Current sensor 68 may be coupled to the output of each filter 62 to provide Icx to the VSCFCU 54.

Generator 52 includes stationary portion 70 and rotating portion 72. Generator 52 includes a controlled rotating DC power supply and a number of generator channels. The amount of channels included in the system 50 may include, but are not limited to, 1 channel, 2 channels, 3 channels, etc. An example of a three-channel system is illustrated in FIG. 1, which may generate a three-phase AC output with 120° degrees with respect to the three channels (phases). Although only a single channel will be described from here on out, it is appreciated that all the channels included in the system 50, for example all three channels, operate in a similar manner.

A stationary part of each generating channel includes a center-tap single-phase main armature winding 74, and a primary winding 76 disposed on the stationary portion 70. A rotating part of each generating channel includes a channel main field winding 78, a main field rotating power converter 80, and secondary control windings 82 and 84 of the controlled rotating transformer connected to the inputs of respective gate drives 86 and 88. The rotating part of the each channel is disposed on the rotating portion 72 of the generator 52.

The generator includes a controlled rotating power supply having a stationary part and a rotating part. The stationary part includes an exciter field winding 90 disposed on the stationary portion 70 of the generator 52. The rotating part includes a three-phase exciter armature winding 92 connected to a 6-pulse rotating rectifier 94, and a DC bus capacitor CdcR, all of which are disposed on the stationary rotating portion 72 of the generator 52. The AC power supplied by the exciter armature winding 92 is converted into a DC power by the rotating rectifier 94. The main field rotating power converter 80 selectively delivers the rectified DC power at the rotating DC bus to the channel main field winding 78. The rotating portion 72 further includes the hi-side gate driver 86 and the lo-side gate driver 88. The hi-side gate driver 86, a lo-side gate driver 88 may selectively be controlled by the VSCFCU 54 to output the signals that to selectively control a respective main field rotating power converter 80.

In the embodiment shown in FIG. 1, each channel main field rotating power converter 80 includes a high-side switch T1r, a low-side switch T2r, and diodes D1r and D2r. By controlling the high-side/low-side switches T1r, T2r via a control signal sent by a respective hi-side gate driver 86/a lo-side gate driver 88, each individual channel may be independently controlled. For example, when switches T1r and T2r of the main field rotating power converter 80 are both turned On, then the positive DC voltage provided by the rotating DC bus is applied to the respective channel main field winding 78 and allows current to build up in the respective channel main field winding 78. In particular, a conductive current path is created from the rotating DC bus through switch T1r to the respective channel main field winding 78 and then through switch T2r. By keeping one of the switch (T2r) On and pulse-width modulating switch T1r the current in the channel main field winding 78 is modulated. When T1r is On the voltage across the main field winding 78 (which is equal to the rotating DC bus voltage), and main field current increases. When T1r is Off the main field current circulates through T2r and D2r and decreases. The voltage across the main field winding 78 is near zero. In order to balance switching losses between T1r and T2r switches, the operating mode of the switches can be alternating: T2r switch is closed, while T1r is in PWM mode for a period of time, and then T2r switch is in PWM mode, while T1r is closed for the same period of time, and so on. When switches T1r and T2r of the main field rotating power converter 80 are both Off, then current flows through diodes D1r and D2r and voltage across the channel main field winding 78 equals negative rotating DC bus voltage forcing current stored in the main field winding 78 to rapidly decrease to zero. The negative energy is fed back to the rotating DC power supply.

The pair of bi-directional switches 58, 60 included in each switching unit 56 alternate a modulated DC power to achieve a balanced AC output at the desired frequency. In at least one embodiment illustrated in FIG. 1, each channel single phase main armature winding 74 is formed as a center-tapped winding having the center connected to a neutral potential point, (e.g., ground) to define an upper-half winding and a lower-half winding. Each switching unit 56 includes a first bidirectional switch 58 and a second bidirectional switch 60. The first bidirectional switch 58 is connected to the upper winding of a respective main armature winding 74 and the second bidirectional switch 60 is connected to the lower winding. Accordingly, the first and second bidirectional switches 58, 60 alternate the voltage at the upper-half and lower-half windings. In at least one embodiment illustrated in FIG. 1, each bidirectional switch 58, 60 includes four diodes and an IGBT switch. The four diodes are constructed as an H-bridge. The IGBT switch is connected in parallel with the H-bridge, and the gate of the IGBT switch is connected to the respective half of the winding, i.e., the upper-half winding or the lower-half winding. The outputs of the first and second bidirectional switches 58, 60 are connected to an input of a respective LC filter 62 via interface inductors 64 to reduce circulating current during IGBT switches commutation. The LC filter 62 filters out the high frequency components from the modulated signal output from the respective bidirectional switches 58, 60.

The VSCFCU 54 monitors the current supplied to exciter field winding 90 and the phase voltage at the output of one or more of the channels via the feedback phase voltage. Accordingly, the VSCFCU 54 may regulate the current supplied to exciter field winding 90 to maintain constant generator system output voltage. In another embodiment, the exciter current supplied to the exciter field winding 90 may be controlled to obtain near speed independent voltage at the rotating DC bus.

In addition, the VSCFCU 54 may modulate the current applied to the generator channel primary windings 76, thereby modulating the current realized at the respective main field winding 74. More specifically, the VSCFCU 54 receives the feedback phase voltage and capacitive current signals (Icx) and may modulate the main field current in response to these signals. The main field current is modulated to achieve constant desired voltage, constant desired frequency, and desired phase shift between the output channels.

While the present inventive concept has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the present general inventive concept not be limited to the particular embodiment(s) disclosed, but that the present general inventive concept will include all embodiments falling within the scope of the appended claims.

What is claimed is:

1. A generator system comprising:
    a generator having a stationary portion and a rotating portion, the generator comprising:
        an exciter field winding disposed on the stationary portion;
        a rotating power supply comprising:
            a three-phase exciter armature winding disposed on the rotating portion;
            a three-phase 6-pulse rectifier disposed on the rotating portion that converts AC power from the exciter armature winding into DC power;
            a DC capacitor disposed on the rotating portion;
        at least one generator channel, comprising:
            a main field winding disposed on the rotating portion;
            a main field power converter disposed on the rotating portion that delivers power to the main field winding;
            a single phase armature winding disposed on the stationary portion to provide AC power at an output of the at least one generator channel;
            a control transformer primary winding disposed on the stationary portion;
            a control transformer secondary windings disposed on the rotating portion to electrically communicate with the control transformer primary winding;
            a set of gate drives that electrically communicate with the control transformer secondary winding, the set of gate drives disposed on the rotating portion that communicates with the main field power converter;
    at least one output channel in electrical communication with a respective at least one generator channel, the at least one output channel comprising:
        first and second bidirectional switches;
        an output filter including a filter capacitor; and
        first and second interface inductors connected between the bidirectional switches and the output filter; and
    a control unit in electrical communication with the at least one output channel and a respective generator channel, the control unit configured to generate control signals based on an output voltage at the output and a capacitor filter current flowing through the filter capacitor.

2. The generator system of claim 1, wherein each bidirectional switch includes a semiconductor switch and a plurality of diodes forming an H-bridge.

3. The generator system of claim 1, wherein the single phase armature winding is formed as a center-tap winding having an upper-half winding and a lower-half winding, the first bidirectional switch connected to the upper-half winding and the second bidirectional switch connected the lower-half winding.

4. The generator system of claim 1, wherein the output filter includes a series inductor and the filter capacitor connected in parallel to a load connected to the output, a current sensor monitoring filter capacitor current, and voltage sensor monitoring voltage across the filter capacitor.

5. The generator system of claim 1, wherein the control unit modulates control transformer primary winding of the at least one generator channel based on the output of the voltage and current sensors, and alternates switching of the first and second bidirectional switches to generate an alternating current having a desired frequency at the output.

6. The generator system of claim 5, wherein the control unit regulates an exciter field current flowing through the exciter field winding as a function of a generator shaft speed to obtain a constant voltage at the main field winding.

7. The generator system of claim 1, wherein the main field power converter comprises:
    a high-side switch connected between a positive DC voltage of a rotating DC bus and a high side of a respective main field winding;
    a low-side switch connected between a negative DC voltage of the rotating DC bus and a low side of a respective main field winding;
    a first diode connected between the high side of a respective main field winding and the negative DC voltage; and
    a second diode connected between the low side of a respective main field winding and the positive DC voltage.

8. The generator system of claim 7, wherein the high-side switch and the low-side switch are turned On to allow the DC voltage provided by the rotating DC bus to be supplied to a respective main field winding and turned Off to rapidly reduce current to zero in the main field winding.

9. The generator system of claim 8, wherein the current in the main field winding is modulated to obtain sinusoidal voltage waveform at a load connected to the output, the current modulated at a desired frequency and a desired phase to satisfy multi-phase system requirements.

* * * * *